US007004500B2

(12) United States Patent
Dinsdale et al.

(10) Patent No.: US 7,004,500 B2
(45) Date of Patent: Feb. 28, 2006

(54) DUAL STAGE INFLATOR WITH EXTENDED GAS DELIVERY FOR A VEHICULAR AIRBAG SYSTEM

(76) Inventors: Paul Dinsdale, 1324 W. 1200, North Farr West, UT (US) 84404; David J. Green, 632 W. 300, North Brigham City, UT (US) 84302; Anthony M. Young, 794 W. Highway 38, Malad, ID (US) 83252

( * ) Notice: Subject to any disclaimer, the term of this patent is extended or adjusted under 35 U.S.C. 154(b) by 40 days.

(21) Appl. No.: 10/264,522

(22) Filed: Oct. 4, 2002

(65) Prior Publication Data

US 2003/0178829 A1 Sep. 25, 2003

Related U.S. Application Data

(63) Continuation-in-part of application No. 10/115,857, filed on Jun. 6, 2002, now Pat. No. 6,854,763, and a continuation-in-part of application No. 10/100,820, filed on Mar. 19, 2002, now Pat. No. 6,746,046, and a continuation-in-part of application No. 10/100,928, filed on Mar. 19, 2002, now Pat. No. 6,820,898.

(51) Int. Cl.
*B60R 21/26* (2006.01)

(52) U.S. Cl. ...................................... 280/737; 280/741

(58) Field of Classification Search ................ 280/737, 280/736, 741, 742, 730.2; 137/68.13
See application file for complete search history.

(56) References Cited

U.S. PATENT DOCUMENTS

| | | | | | |
|---|---|---|---|---|---|
| 3,877,882 | A * | 4/1975 | Lette et al. | ................. | 280/741 |
| 3,961,806 | A * | 6/1976 | Katter | ........................ | 280/737 |
| 5,794,973 | A * | 8/1998 | O'Loughlin et al. | ........ | 280/737 |
| 5,992,881 | A * | 11/1999 | Faigle | ........................ | 280/737 |
| 6,086,094 | A * | 7/2000 | Stevens et al. | ............. | 280/737 |
| 6,206,412 | B1 * | 3/2001 | Swann et al. | .............. | 280/736 |
| 6,572,141 | B1 * | 6/2003 | Nanbu | ........................ | 280/737 |

FOREIGN PATENT DOCUMENTS

| | | | |
|---|---|---|---|
| DE | 19930239 | A1 | 1/2001 |
| DE | 100 40 822 | A1 | 4/2001 |
| DE | 101 38 245 | A1 | 5/2002 |
| EP | 949126 | A2 * | 10/1999 |
| WO | WO-03/080392 | | 10/2003 |

* cited by examiner

*Primary Examiner*—David R. Dunn
(74) *Attorney, Agent, or Firm*—Sally J Brown

(57) ABSTRACT

A dual stage inflater for providing an extended flow of inflation gas to an airbag or inflatable curtain is disclosed. The inflator includes a first gas chamber having an exit orifice, the exit orifice having an open configuration and a closed configuration. Additionally, the inflator has a second gas chamber in gaseous communication with the first gas chamber. The first and second gas chambers are separated by a flow restrictor positioned between them. This restrictor controls the flow of gas out of the second gas chamber. The inflator includes an initiator in communication with the interior of one of the gas chambers that is configured to selectively initiate a flow of gas through the exit orifice of the first gas chamber. The exit orifice of the inflator may be disposed within an inlet port of an inflatable curtain to cause inflation gases exiting the inflator through the exit orifices to enter directly into the airbag or inflatable curtain.

42 Claims, 4 Drawing Sheets

DUAL STAGE INFLATOR WITH EXTENDED GAS DELIVERY FOR A VEHICULAR AIRBAG SYSTEM

RELATED APPLICATIONS

This application is a continuation-in-part of U.S. Ser. No. 10/115,857, filed Jun. 6, 2002, now U.S. Pat. No. 6,854,763 and entitled "Biaxial Flow Inflator With Independently Adjusted Gas Orifices," and U.S. Ser. No. 10/100,820, filed Mar. 19, 2002, now U.S. Pat. No. 6,746,046 and entitled "Dual Flow Inflator for A Vehicular Airbag System," and U.S. Ser. No. 10/100,928 filed Mar. 19, 2002, now U.S. Pat. No. 6,820,898 and entitled "Biaxial Dual Stage Inflator With Extended Gas Delivery For A Vehicular Airbag System."

BACKGROUND OF THE INVENTION

1. Field of the Invention

The present invention relates to systems and methods for protecting vehicle occupants from injury. More specifically, the present invention relates to a dual stage inflator for a vehicular airbag system that provides extended gas delivery by injecting multiple gas flows into an airbag system such as an inflatable curtain.

2. Description of Related Art

The inclusion of inflatable safety restraint devices, or airbags, is now a legal requirement for many new vehicles. In addition to this, inflatable airbags enjoy widespread acceptance for use in motor vehicles and are credited with preventing numerous deaths and injuries. Some studies estimate that the use of frontally placed airbags reduces the number of fatalities in head-on collisions by 25% among drivers using seat belts and by more than 30% among unbelted drivers. Other research suggests that in a frontal collision, the combination of a seat belt and an airbag can reduce serious chest injuries by 65% and serious head injuries by up to 75%. These numbers and the thousands of prevented injuries they represent demonstrate the life-saving potential of airbags and the need to encourage their use, production, and development.

As a result in part of benefits such as those described above, automakers are now required to install airbags in most new vehicles bound for sale in the United States. Many automobile manufacturers have turned this requirement of implementation of airbag technology into a marketing tool. Enticed by the promise of added safety, vehicle purchasers frequently seek out vehicles with sophisticated airbag systems.

Airbags are typically installed in the steering wheel and in the dashboard on the passenger side of a car. In the event of an accident, an accelerometer situated within the vehicle measures the abnormal deceleration caused by the accident and triggers the expulsion of rapidly expanding gases from an inflator into each of the airbags. The expanding gases rapidly fill the airbags, which immediately inflate in front of the driver and passenger to protect them from impact against the windshield, dashboard, or steering wheel. Thus used, vehicular airbags have saved countless human lives.

As a result of the success of front-installed airbags, other airbags designed to protect occupants in other types of vehicular collisions have been developed. Side impact airbags, often in the form of inflatable curtains, were one such airbag developed in response to the need for protection from impacts in a lateral direction, or against the side of the vehicle. Such curtains are placed along the side of a vehicle in places such as the ceiling or roof rails. An inflatable curtain may be composed of one or more separately inflated cushions that protect individual passengers in different positions within the vehicle.

Side impact cushions are often designed to unfold or unroll downward from their installation site to inflate beside a vehicle occupant to keep the vehicle occupant from hitting the door or window during a lateral impact event. Since the vehicle occupant may be leaning forward, reclined in the seat, or at any position between, such cushions are often made somewhat long to ensure that even such an "out-of-position" occupant hits the cushion.

In some installations, multiple cushions may be fed by a single inflator as a result of space constraints or other considerations. The inflator may be placed at either end of a cushion. In situations where multiple cushions are fed by a single inflator positioned either fore or aft of the cushions, an especially long gas flow path exists between the inflator and the cushion furthest from the inflator. This long gas flow path may reduce the speed of the gas flow, thus resulting in delayed inflation of the furthest cushions. Furthermore, the outermost extents of an inflatable curtain in such an installation may receive insufficient inflation gas pressure to inflate the curtain to the optimal protective pressure.

Even in somewhat shorter cushions, rapid and even inflation can be difficult to achieve with known inflator designs. Many existing inflators eject inflation gases outward radially. As a result of this, the inflation gases are not propelled along the length of the cushion with sufficient force to reach its outer edges, but are instead largely directed into the cushion near the inflator. The outer regions of the cushion are thus inflated later than those closest to the inflator.

Additionally, some inflatable curtain systems are somewhat expensive due to the need for multiple inflators, attachment mechanisms, and the like. Many inflatable curtain systems require the use of a "gas guide," or conduit that conveys gas from the inflator to the inflatable curtain.

In addition to this, in collisions which result in vehicle rollovers, the time period during which a vehicle occupant may be injured by striking a lateral side of the vehicle is often much longer than in a conventional collision. As a result of this, it would be beneficial to the occupants for the airbags to remain inflated during that period in order to protect them from injury. Conventional inflators, however, are largely incapable of providing such a long period of inflation.

Further, in some collisions, it would be beneficial for an airbag inflator to be "smart," or capable of providing different amounts of gas to an airbag to inflate it to different levels of hardness in response to different collisions. Most currently known airbags are capable of providing a single inflation pressure. Similarly, it would be beneficial to provide an inflator that is capable of producing a second flow of inflation gas at a controllable delay from a first flow of inflation gas in order to either maintain inflation of an airbag or reinflate an airbag.

Accordingly, a need exists for an inflator and related methods that remedy problems found in the prior art. Such an inflator should preferably provide relatively even and rapid inflation of an associated inflatable curtain, preferably without requiring multiple inflators for a single curtain. Such an inflator should also preferably be simple and inexpensive to manufacture and install.

SUMMARY OF THE INVENTION

The apparatus of the present invention has been developed in response to the present state of the art, and in particular, in response to the problems and needs in the art that have not yet been fully solved by currently available inflators. Thus, it is an overall objective of the present invention to provide an inflator and related systems and methods that provide rapid, even, and sustained inflation while reducing manufacturing and installation costs.

The inflator first includes a first gas chamber with an exit orifice. This first gas chamber is configured to contain an inflation charge that may be controllably released through the exit orifice to produce a first gas flow. The first gas chamber may additionally include an initiator to activate the inflator.

The inflator next includes a second gas chamber in fluid connection with the first gas chamber. The first and second gas chambers are linked by a flow restrictor. As with the first gas chamber, the second gas chamber is configured to contain an inflation charge that may be controllably released through the flow restrictor into the first gas chamber to produce a second gas flow. Similarly, as with the first gas chamber, the second gas chamber may include an initiator to start the second flow of gas.

The flow restrictor of the inflator generally includes a restricted flow channel such as a capillary tube. The size of the restricted flow channel may be selected to limit or control the rate at which the inflation charge housed in the second gas chamber may escape into the first gas chamber. In some embodiments of the invention, the flow restrictor is open, permitting fluid communication between the first and second gas chambers. In such inflators, a pressure differential may not be maintained between the two chambers of the inflator.

Alternatively, the inflator may further include frangible seals positioned over orifices such as the exit orifice of the first gas chamber, and the flow restrictor of the second gas chamber. Such frangible seals serve to segregate the contents of each gas chamber from the other, and to segregate the contents of the inflator from the outside environment. Frangible seals are generally surfaces that open in some manner when the pressure within the gas chamber to which they are attached exceeds the strength of the seal or its bond to the surface. Suitable frangible seals may include burst discs, scored surfaces, and compression seams.

The frangible seals may first be placed over the exit orifice to segregate the contents of the inflator. In such inflators, activation of the initiator may be tuned to produce sufficient pressure to open the frangible seal and allow the inflation charge to escape the first gas chamber to produce the first flow of gas. In alternate embodiments of the invention, frangible seals may additionally be placed over the first-gas-chamber-side opening orifice of the flow restrictor to segregate the contents of the second gas chamber.

Various means may be used to open this seal to allow the production of the second flow of gas. Specifically, the frangible seal may be configured to rupture at a specific pressure differential between the first and second gas chambers. This pressure differential may be produced passively, such as by escape of gas from the first gas chamber, or actively, as by use of a second initiator positioned in communication with the second gas chamber.

In a preferred embodiment of the invention, the inflator comprises first and second gas chambers linked by a flow restrictor. The exit orifice of the first gas chamber and the flow restrictor of the second gas chamber may both be sealed with a frangible seal such as a burst disc. The first and second gas chambers of this embodiment further include initiators which may be controlled in order to selectively produce the first and second flows of gas when desired. The second flow of gas may be produced automatically, or when control systems linked to the airbag system determine that production of the second flow of gas is needed.

The gas chambers of the inflator are configured to retain an inflation charge including a gas generant.

The gas generant may include a pressurized gas or mixture of gases, a liquefied gas, a solid, or any mixture of the above. The gas may be argon, helium, carbon dioxide and nitrous oxide. Specifically, the gas-producing material may be a liquid/gas mixture that has been cryogenically inserted into the gas chamber in solid form. The inflation charge may be sealed in the first gas chamber using a burst disc.

The initiator coupled to either or both of the gas chambers may include a pyrotechnic charge to assist in heating the liquid/gas mixture to cause the expansion of the inflation charge. This expansion may cause a pressure shock that removes burst discs from openings within the gas chambers, thereby opening the inflator and beginning inflation of the airbag. As the inflation charge warms and becomes gaseous, the pressure inside of the inflator rises, thus causing a first flow of gas from the first gas chamber of the inflator. The first and second gas chambers may include inflation charges similar to or different from each other.

Various methods and compositions may be used to provide an inflation charge for the inflator. A gas may simply be pressurized and released on activation to expand to fill a larger volume when released from the inflator. Other gases may be dissociated by heat or another similar means to produce multiple gases that occupy a larger volume of space than the parent gas.

Other advantages may be realized when a liquefied gas is used. Specifically, as the liquid changes phase to a gas, it expands to occupy a greater volume, thus filling the airbag. Additionally, due to the latent heat of vaporization of the gas, the gas produced from the liquid and channeled into the airbag will be colder than the ambient air that surrounds the airbag. As this inflation gas warms to ambient temperature, it expands, thus providing additional inflation pressure to the airbag and extending the length of time for which the airbag is inflated.

Seals such as frangible seals may preferably be used in inflators at locations such as the exit orifice and the flow restrictor in which the inflation charge of the second gas chamber at least partially comprises a liquefied gas. The seal serves to segregate the liquid gas to a specific gas chamber. Inflators of the invention using burst discs may additionally include a burst disc retention member to segregate a spent burst disc and prevent its ejection from the inflator.

The exit orifice is preferably located in portions of the inflator adapted to be attached to an airbag. Specifically, the inflator may comprise a first gas chamber with a first end disposed within a first inlet port of the inflatable curtain. The first gas chamber may comprise one unitary body. The first inlet port of the airbag may be tightly affixed to the first gas chamber such that gas is unable to escape from the inflatable curtain between the inlet port and the gas chamber.

According to the present invention, such dual-stage inflators may include additional second chambers to extend the length of time for which the inflator is capable of providing a flow of gas, as well as to increase the amount of gas that the inflator is capable of producing. Such additional second chambers may be placed along a longitudinal axis shared by the other second and first gas chambers, or they may be placed along other axes at angles to the other gas chambers.

Through the use of the inflators of the present invention, cost savings may be obtained through the elimination of gas guides and redundant inflators. Additionally, more rapid and even inflation of the inflatable curtains may be obtained. As a result, the availability and effectiveness of vehicular airbag systems may be enhanced.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the apparatus, system, and method of the present invention, as represented in FIGS. 1 through 4, is not intended to limit the scope of the invention, as claimed, but is merely representative of presently preferred embodiments of the invention.

The present invention provides an apparatus whereby problems associated with previously known inflators can be resolved. Through the use of axial flow, inflation gas can be injected into an airbag away from exit orifices of the inflator. Hence, the inflatable curtain deploys more evenly to provide better occupant protection. Additionally, the inflator may selectively provide first and second flows of gas to extend the time of inflation of an airbag, or even to reinflate an airbag. The manner in which these principles are utilized in the present invention will be shown and described in greater detail in the following discussion.

Figure 1:
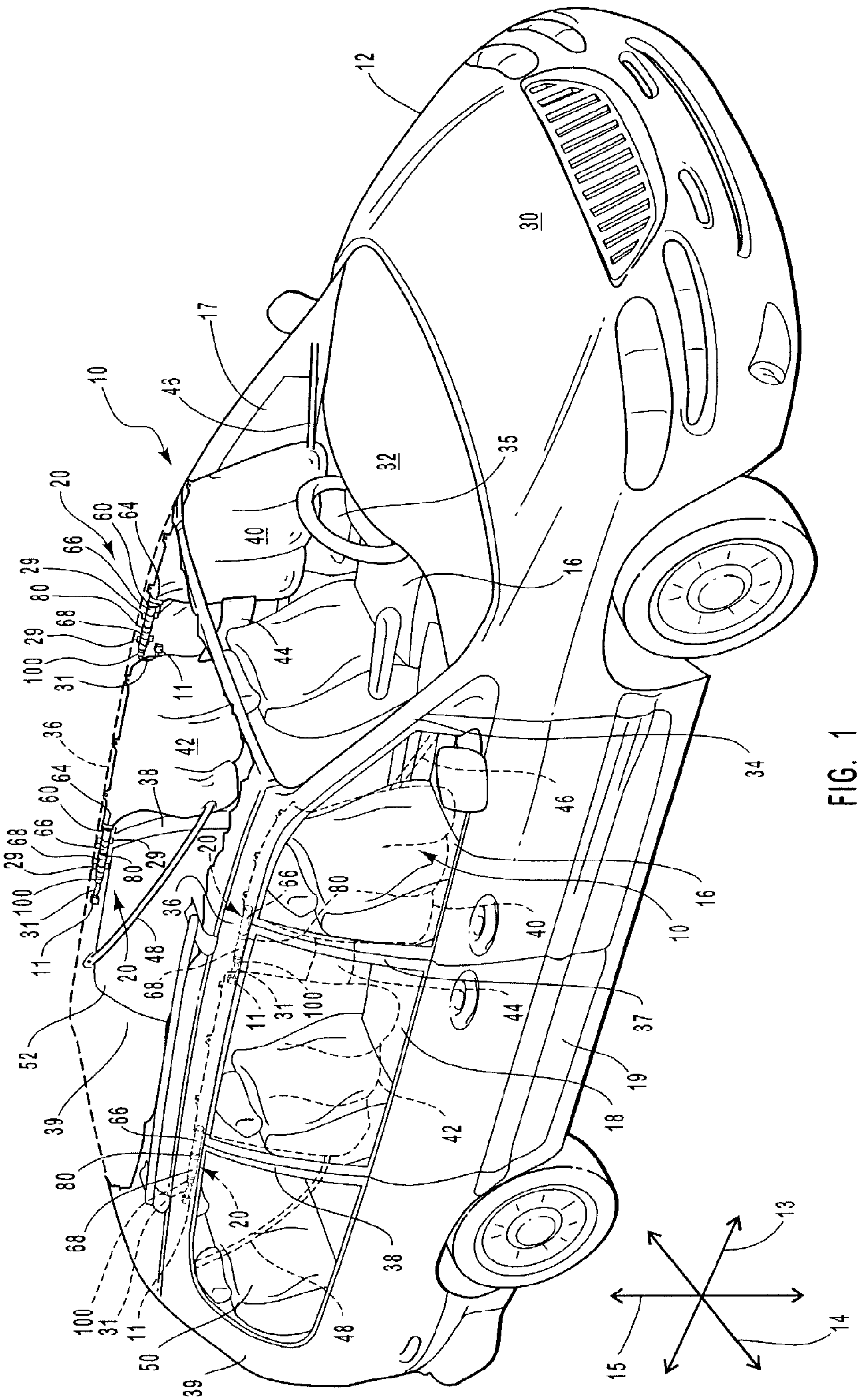
FIG. 1 is a perspective view of a vehicle with an inflatable curtain that incorporates an inflator according to the invention.

Referring to FIG. 1, an inflatable curtain 10 attached to one possible inflator of the invention is shown installed in a vehicle 12. The inflatable curtain 10 may form part of an airbag system configured to protect one or more vehicle occupants against lateral impact.

The vehicle 12 has a longitudinal direction 13, a lateral direction 14, and a transverse direction 15. The front seats 16 of a vehicle 12 are laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted. As shown, two such inflatable curtains 10 may be used in the vehicle: one for the driver's side of the vehicle 12, and another for the passenger's side.

One or more accelerometers 11 or other similar impact-sensing devices are used to detect sudden lateral acceleration (or deceleration) of the vehicle 12 and transmit electric signals via electric lines 31 to one or more inflators 20 that provide flows of pressurized gas to inflate the inflatable curtains 10. As shown in FIG. 1, a single inflator 20 may be used to inflate each of the protection zones of the inflatable curtains 10. Specifically, a single inflator 20 may be used to inflate the first protection zone 40 and the second protection zone 42 of each inflatable curtain 10. Alternatively, a single inflator 20 may be used to inflate both protection zones 40, 42 by interconnecting them and attaching inflator 20 to one end of the combined curtain 10. The inflators 20 may be affixed to the vehicle 12 through the use of relatively simple mounting brackets 29.

A first set of the inflators 20 may be positioned approximately midway along the longitudinal length of the inflatable curtains 10 to provide rapid and even inflation of the first protection zone 40 in a manner that will be described in greater detail below. Similarly, a second set of the inflators 20 may be positioned at the back end of the longitudinal length of inflatable curtains 10 to provide relatively rapid and even inflation of the second protection zone 44 of the inflatable curtains 10 in a manner that will be described in greater detail below.

Each of the inflators 20 may take the form of a hollow pressure vessel containing a chemically reactive material and/or compressed gas referred to as an "inflation charge." This inflation charge produces a volume of gas upon initiation of the inflator 20. This volume of gas exits the inflator 20 to provide an outflow of inflation gases. In the configuration of FIG. 1, the inflators 20 are partially enveloped within the inflatable curtains 10 so that inflation gases exiting the inflators 20 flow directly into the inflatable curtains 10. Specifically, the inflators 20 are attached to the inflatable curtains 10 at the inlet ports 60 of the curtains 10. This attachment may be made using ring-shaped clamps 64 to secure the inflator 20 to the inlet port 60 of the curtain 10.

The inflators 20 may operate with such rapidity that, before the vehicle 12 has fully reacted to the impact, the inflatable curtains 10 have inflated to protect vehicle occupants from it. Additionally, the inflators 20 may operate in such a prolonged manner that the inflatable curtains may remain inflated throughout the impact event or vehicle rollover.

Optionally, the accelerometer 11 may be stowed within an engine compartment 30 or dashboard 32 of the vehicle 12. A controller (not shown) may also be used to process the output from the accelerometer 11 and control various other aspects of a vehicle safety system of the vehicle 12; such a controller may also, for example, be positioned in the engine compartment 30 or dashboard 32, proximate the accelerometer 11. Such a controller could be configured to sequentially fire the initiators in a "smart airbag" when a rollover event or other event requiring extended inflation was detected. In such configurations, the electrical line 31 and/or other control wiring may be disposed along the A pillars 34 of the vehicle 12, located on either side of the windshield 35, to reach the inflators 20. Alternatively, each accelerometer 11 may be positioned near one of the inflators 20, as shown in FIG. 1.

The inflators 20 and the inflatable curtains 10 may be installed by attaching them to roof rails 36 of the vehicle 12.

Depending on the model of the vehicle 12 and the desired configuration of the inflatable curtains 10, airbag components may also be disposed along the B pillars 37, C pillars 38, and/or D pillars 39.

The inflatable curtains 10 shown in FIG. 1 are configured to protect not only occupants of the front seats 16, but those of the rear seats 18 as well. Thus, each inflatable curtain 10 may have a first protection zone 40 configured to inflate between the front seat 16 and one of the front doors 17, and a second protection zone 42 configured to inflate between the rear seats 18 and one of the rear doors 19. The first and second protection zones 40, 42 may be made up of multiple cushions that are isolated from each other. The inflatable curtains 10 may alternatively be parts of the same cushion, i.e., the first and second protection zones 40, 42 may be in fluid communication with each other, even when gas is not able to flow through the inflator 20 between the first and second protection zones 40, 42. The first and second protection zones 40, 42 of each inflatable curtain 10 may be attached together through the use of a connection zone 44 positioned between the protection zones 40, 42. The connection zone 44 may provide a flow path through which gases can flow between the first and second protection zones 40, 42.

Each of the inflatable curtains 10 may have a front tether 46 attached to the A pillar 34 and a rear tether 48 attached to the roof rail 36 to exert tension on the inflatable curtains 10 to keep them in place during inflation and impact. Those of skill in the art will recognize that the tethers 46, 48 may also be attached to other parts of the vehicle 12, such as the B pillars 37, C pillars 38, and/or D pillars 39. The tethers 46, 48 may be constructed of standard seatbelt webbing or the like.

Although each inflatable curtain 10 in FIG. 1 has two protection zones 40, 42, the invention encompasses the use of inflatable curtains with any number of protection zones. Thus, if desired, each of the inflatable curtains 10 may be extended to have one or more protection zones positioned to protect occupants of extra seats 50 behind the rear seats 18 from impact against third lateral surfaces 52 of the vehicle 12. Additional inflators 20 may be used to inflate such additional protection zones, with either one inflator 20 used per protection zone, or one inflator 20 used for several protection zones.

The inflators 20 of the invention are uniquely configured to provide rapid, even inflation as well as simple and inexpensive manufacturing and installation. FIG. 1 further shows a slightly enlarged perspective view of an inflator 20 including first gas chamber 66, second gas chamber 68, and flow restrictor 80. The inflator also comprises initiation assembly 100, attached to the accelerometer 11 of the vehicle 12 by electric line 31. The configuration of the inflator 20 will be described in greater detail in connection with FIG. 2.

Figure 2:
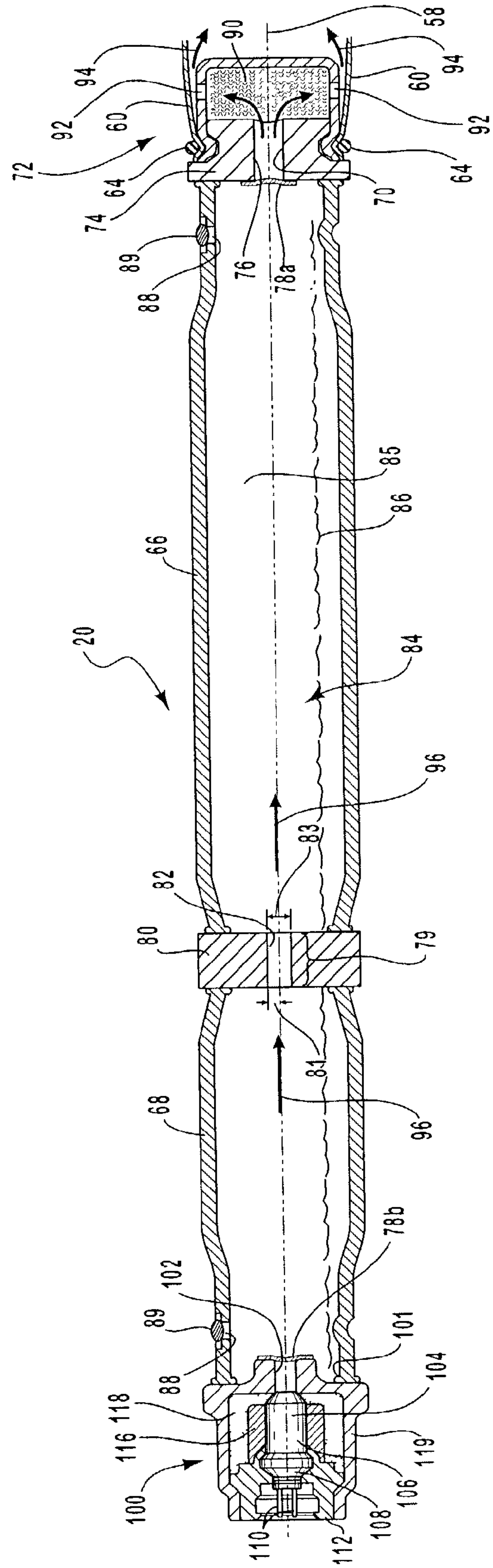
FIG. 2 is a side elevation, cross sectional view of the inflator of FIG. 1.

Referring to FIG. 2, a side elevation, cross sectional view of the inflator 20 is shown. The inflator 20 may have a first gas chamber 66 formed of a material with a comparatively high tensile strength, such as steel, for retaining the inflation charge. The first gas chamber 66 may be formed of a single, unitary piece. In the alternative, the first gas chamber 66 may be made from multiple pieces that are welded or otherwise attached together to provide the configuration shown in FIG. 2. The first gas chamber 66 may have a generally tubular shape that includes flat, hemispherical, or otherwise dome-like caps.

The first gas chamber 66 may be positioned within a first inlet port 60 of the first protection zone (not shown) of an inflatable curtain (not shown) so that inflation gas leaving the first gas chamber 66 directly enters the first and second and other subsequent protection zones (not shown). Hence, a gas guide or other type of conduit used to channel the inflation gas from the inflator 20 to the inflatable curtain 10 is not required. The inflator 20 may simply be clamped in gas-tight fashion within the first inlet port 60, for example, through the use of ring-shaped clamps 64 that tightly press the fabric of the inlet port 60 against the outer surface of the inflator 20.

The dimensions of the first gas chamber 66 may be varied to suit the volume in which the first gas chamber 66 is to be installed. For example, the first gas chamber 66 may be made longer than shown in the longitudinal direction 13 and/or thinner in the lateral and transverse directions 14, 15 to facilitate installation in a long, narrow space such as the space beside the roof rail 36. A longer first gas chamber 66 may be installed such that the first gas chamber 66 extends a significant distance into each protection zone of an inflatable curtain (not shown). Such installation may advantageously provide inflation gas flows that enter an inflatable curtain about midway through the protection zones for more even inflation.

The first gas chamber 66 may have an exit orifice 70 disposed within the first inlet port 60 of the airbag. The exit orifice 70 has an open configuration, in which inflation gas can pass relatively freely through the exit orifice 70, and a sealed configuration, in which substantially all inflation gasses are trapped within the first gas chamber 66. Consequently, "exit orifice" refers to a passageway as well as to the structure that provides selective closure of the passageway.

More precisely, the exit orifice 70 may include an interior cap 74, as illustrated in FIG. 2. This interior cap 74 may have an opening 76 against which a burst disc **78*a* is pressed by the pressure within the gas chamber 66. A burst disc 78*b* may also be placed over the initiator aperture 102 of the initiator assembly 100 of the inflator. In alternative embodiments of the invention, a burst disc may be placed over the aperture of the flow restrictor 80. These burst discs 78*a*, 78*b* may have a wide variety of configurations. Specifically, if desired, each of the burst discs may have a slightly domed shape to provide a tight seal with the circular shape of the associated opening 76**.

The burst discs **78*a*, 78*b* are preferably shaped to deflect under a pressure shock and/or increase to uncover the opening 76 and the initiator aperture 102. For example, the burst discs 78*a*, 78*b* may be made to bend enough to fit through the openings 76, so that a pressure shock and/or increase ejects the burst discs 78*a*, 78*b* from the opening 76 and the initiator aperture 102. The burst discs may simply have a pressure threshold above which sufficient deformation occurs to push the burst disc 78*a* through its opening 76. Alternatively, the burst discs 78*a*, 78*b* may deform primarily in response to shock, or rapid pressure changes within the gas chamber 66 or initiator assembly 100**.

In order to prevent the ejected burst discs from damaging the inflatable curtain or other airbag to which the inflator 20 is attached, the inflator 20 may also have a burst disc retention member 90 that is disposed outside of the exit orifice 70. The burst disc retention member 90 may have a wide variety of configurations. As illustrated, the burst disc retention member 90 may take the form of a thickened pad or screen through which inflation gases pass relatively freely. The burst discs **78*a*, and possibly 78*b* are captured by the burst disc retention members 90 after ejection from the opening 76. The burst discs 78 may remain in front of the openings 76, in which case inflation gases flow around the burst discs 78 to exit the inflator 20**.

The inflator 20 may also have ejection nozzles 92 disposed outside the exit orifices 70 and the burst disc retention members 90. These ejection nozzles 92 assist in modifying the amount and/or speed of the first and second flows of gas that issue from the inflator.

The dual-stage inflator 20 of this invention also includes a second gas chamber 68 and a flow restrictor 80. This second gas chamber 68 is configured to retain an inflation charge including a gas generant 84, and to provide a second flow of gas 96 into the first gas chamber 66. The second gas chamber 68 is configured to retain an inflation charge in a manner similar to the first gas chamber 66. The inflation charge of the second gas chamber 68 may be the same as the inflation charge of the first gas chamber 66, or alternatively, the inflation charge may be different in composition, pressure, or form.

The second gas chamber 68 is connected to the first gas chamber 66 by a flow restrictor 80. This flow restrictor 80 may be shaped as a connecting ring with a flow restrictor orifice 82. The flow restrictor 80 may additionally comprise a frangible seal such as a burst disc, a scored surface, or a compression seam.

The second gas chamber 68 of this invention is configured to provide a second flow of gas 96 to an airbag coupled to the inflator to initially inflate the airbag, and then to maintain that inflation for a period of time. The initial inflation may be largely provided by the inflation charge of the first gas chamber 66 and the first flow of gas 94 it produces. The maintenance of the initial inflation may largely be provided by the second flow of gas 96 from the second gas chamber 68. The maintenance, or second flow of gas 96 may be delivered by providing a flow restrictor 80 that may take the form of a restricted flow channel 79. Such a restricted flow channel 79 may be a capillary tube with a narrow flow restrictor orifice 82 that limits the rate at which the inflation charge housed in the second gas chamber 68 may escape. The flow channel 79 may be defined by a flow restrictor orifice radius 81 and a flow restrictor orifice diameter 83.

In inflators such as 20 that are configured such that the flow restrictor 80 has no component that completely closes the restrictor, the inflation charges of the first and second gas chambers 66, 68 may mingle freely. As a result of this, no pressure differential between the chambers 66, 68 may be maintained.

Figure 3:
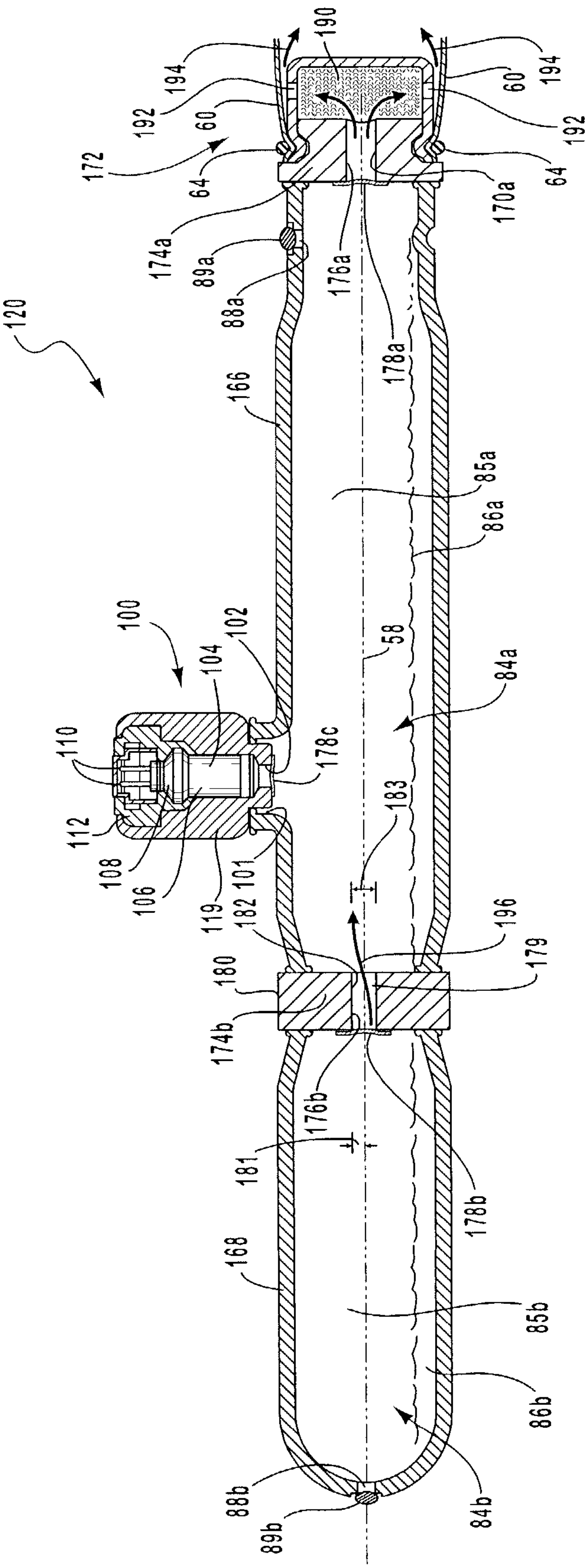
FIG. 3 is a side elevation, cross sectional view of an alternative embodiment of the inflator of the invention.

The inflator 20 of the invention may alternatively provide the second flow of gas 96 by providing a frangible seal on the flow restrictor 80. Suitable frangible seals may include burst discs (such as burst disc 78 used with the first gas chamber 66), scored surfaces (not shown), and compression seams (not shown). These seals may be placed to prevent gas flow from the second gas chamber 68 until the airbag has been activated. Such an inflator is shown in FIG. 3 discussed below in detail.

Frangible seals such as those optionally used with the first and second gas chambers 66, 68 include surfaces that open when the pressure within the gas chamber 66, 68 exceeds the strength of the surfaces.

One such frangible seal is a scored surface. Scored surfaces have scores that are weakened regions formed by gouging the surface. Such a score could, for example, be formed with a sharpened tool constructed of hard steel, tungsten carbide, diamond, or the like. The tool may be shaped to peel off a layer of the material of the surface, and multiple operations may be used to remove the desired amount of material. Such scores could take a wide variety of configurations. In one example, each score may simply comprise a single line disposed within the plane perpendicular to the transverse direction in relation to the surface. Alternatively, a star-like shape with multiple intersecting scores may be used. With a star-like shape, multiple wedge-shaped deformable portions would exist between the intersecting scores, and each deformable portion would bend or "bloom" outward upon failure of the scores.

The depth of scores may be selected such that the score ruptures when the pressure within the gas chamber reaches a predetermined threshold, or when the pressure shock within the gas chamber reaches a predetermined threshold. A deeper score would produce an opening that opens in response to a lower pressure or shock. Additionally, scores could be made of an equal depth to ensure that the scored surfaces open simultaneously. Further, individual scores may be varied in depth, length, width, or configuration to provide different timing and/or gas flow characteristics for the inflator.

Some score configurations produce a set of lips upon failure that may deflect outward somewhat to reach a deformed configuration. In the deformed configuration, the lips may be separated somewhat to provide an opening through which inflation gas can escape. In this configuration, the lips perform the functions accomplished by the openings and the ejection nozzles used alternatively. Indeed, the lips may be configured to deflect such that an opening of a desired size is produced.

A "compression closure" may be defined as an opening that has been closed, or nearly closed, through mechanical deformation of the material surrounding the opening. Thus, compression closures include openings that have been crimped, swaged, twisted, folded, or otherwise deformed into a closed position. Such closures may be formed through methods including the application of mechanical compression perpendicular to the axis of the opening. This compression may form a crimp or weld that may rupture in response to a high pressure or pressure shock within the gas chamber the crimp or weld is sealing. This rupture would result in the seal taking on a deformed configuration that permits the inflation gas to escape the gas chamber. The compressive force applied to close the lips and the weld strength of the weld may be selected to obtain a desired threshold pressure or shock.

Where multiple frangible seals are used in an inflator such as an inflator with multiple compartments, features such as the size and depth of a score, and the compressive force and the weld strength of a compression seam may be toleranced somewhat tightly to ensure that the frangible seals open simultaneously.

The frangible seal surface may in some cases be placed outside of the exit orifice to open to form a suitable ejection nozzle (in the place of ejection nozzles 92) for the second gas chamber 68 or the exit orifice 70. Such configurations allow for different substances to be used for inflation charges in the first and second gas chambers 66, 68, and also allow for the use of inflation charges with different pressures in the gas chambers 66, 68.

Frangible seals such as burst discs may preferably be used in inflators in which the inflation charge of the second gas chamber 68 at least partially comprises a liquid gas producing material 86 such as a liquefied gas. In such applications, the seals segregate the liquid 86 from the first gas chamber 66. In those inflators 20 of the invention that have burst discs such as **78*a*, 78*b*, a burst disc retention member 90 may further be included to trap and retain a spent burst disc 78 and prevent its ejection from the inflator 20**.

According to the present invention, such dual-stage inflators may include additional second chambers to extend the length of time for which the inflator is capable of providing a flow of gas, as well as to increase the amount of gas that the inflator is capable of producing. Such additional second chambers may be placed along a longitudinal axis shared by the other second and first gas chambers, or they may be placed along other axes at angles to the other gas chambers.

Upon deployment of the inflator 20, a first gas flow 94 may exit the first gas chamber 66 via the first exit orifice 70, and a second gas flow 96 may exit the second gas chamber 68 via the flow restrictor orifice 82. The gas flows may be smoothly integrated and indistinguishable from each other, or they may be separated by sufficient time that the first and second gas flows are distinguishable. The first and second gas flows 94, 96 may then travel to reach the corresponding inlet port 60 of an airbag such as an inflatable curtain (not shown).

As shown, the first and second gas flows 94, 96 travel in the longitudinal direction 13, along the longitudinal axis 58 of the inflator 20. The inflator 20 may be comparatively easily installed in the vehicle 12 to obtain the configuration depicted in FIG. 1. For example, the first end 72 of the first gas chamber 66 may be inserted into the first inlet port 60 of an inflatable curtain (not shown). The curtain may then be attached to the roof rail 36 in the position shown in FIG. 1, and the inflator 20 may be attached to the roof rail 36 with mounting brackets such as mounting brackets 29.

The steps described above for installing the airbag inflator may be reordered in many ways to suit the particular configuration of the vehicle 12. For example, the inflator 20 may first be attached to the roof rail 36 with the mounting brackets 29, and the inlet port 60 may then be fitted around the first gas chamber 66. The inflatable cushion 10 may then be fixed in place.

The ejection nozzles 92 are optional; inflation gases may simply be allowed to freely escape the inflator 20. However, the ejection nozzles 92 may be tuned and shaped to provide more accurate direction of the first and second gas flows 94, 96. The ejection nozzles 92 may also increase the rate at which the first and second gas flows 94, 96 escape the inflator 20, so that the gas flows 94, 96 have the momentum to travel further into the inflatable curtain 10. Such rapid ejection may help to ensure that the portions of the inflatable curtain 10 that are furthest from the inflator 20 are adequately inflated prior to impact of the vehicle occupant against the inflatable curtain 10.

A dual flow inflator may be activated in a variety of ways to inflate the inflatable curtain 10. According to one embodiment, the first and second gas flows 94, 96 may both be triggered by the action of a single initiation assembly 100. The initiation assembly 100 may have an assembly aperture 101 that is in communication with the interior of the second gas chamber 68. The initiation assembly 100 may, for example, be laser welded in place to prevent the escape of inflation gases through the initiator aperture 102 or ejection of the initiation assembly 100 during deployment of the inflator 20. The initiation assembly 100 may alternatively be positioned in the first gas chamber 66.

The initiation assembly 100 may have an initiator 104, which is an electrically triggered pyrotechnic device. The initiator 104 may, for example, have a head 106 that contains pyrotechnic material, a body 108, and electrical prongs 110 through which the activation signal is received. The body 108 may be seated within an initiator retention member 112. The prongs 110 may be inserted into a plug (not shown) of the electric line 31 leading to the accelerometer 11.

If desired, the initiation assembly 100 may also have a quantity of booster material 118 that intensifies the thermal energy provided by the initiator 104. The booster material 118 may be separated from the initiator 104 by a dome 116 designed to rupture, or even disintegrate, upon activation of the initiator 104. Alternatively, the booster material 118 may be housed within the initiation assembly 100 itself. The initiation assembly 100 may also have a housing 119 that encases and protects the booster material 118 and the initiator 104. If desired, the housing 119 may effectively isolate the initiator 104 and the booster material 118 from the pressure within the secondary gas chamber 68.

The inflator 20 may be of any type, including pyrotechnic, compressed gas, and hybrid types. In the inflator of FIG. 2, the inflator 20 is a hybrid type inflator, with the pyrotechnic of the booster material 118 as well as a gas-producing material (or "gas generant") 84 in a compressed state. Due to the compression, the gas-producing material 84 may exist in the form of a gas 85 as well as a liquid 86 within the first gas chamber 66. Alternatively, in a pyrotechnic inflator, the gas-producing material may not be an inert compressed liquid, gas, or mixture, but may take the form of a combustible solid or liquid.

With the inert, compressed, gas-producing material 84 of FIG. 2, the initiation assembly 100 deploys within milliseconds to produce heat that causes expansion of the gas-producing material 84. The result is a sudden pressure shock and pressure increase within the gas chamber 66. The pressure shock and/or increase dislodges the burst disc 78 to open the first exit orifice 70 and allow the first gas flow 94. As the gas 85 flows out of the inflator 20, the liquid 86 is vaporized to add to the volume of the first gas flow 94. The gas 85 and liquid 86 present in the second gas chamber 68 next begin to exit the inflator 20, thus causing the second gas flow 96. As a result, a considerable amount of gas can be produced by the inflator 20 over a controllable time period despite its modest size.

The use of the liquid gas producing material 86 may be beneficial because the liquid 86 will absorb heat as it vaporizes. Hence, the first and second gas flows 94, 96 will be comparatively cool, and therefore less likely to damage the inflatable curtain 10. The inflatable curtain 10 may therefore be made from a comparatively less heat-resistant and quite possibly cheaper material. For example, a thinner silicon coating for the fabric of the inflatable curtain 10 may be sufficient to protect the fabric from thermal damage. Additionally, as the gas 85 resulting from the liquid 86 begins to warm to ambient temperatures, it expands, thus extending the period of time for which the curtain 10 remains inflated and capable of providing protection to a vehicle occupant.

The inflator 20 is seen to be inexpensive and easy to manufacture in comparison to many other airbag inflators. According to one manufacturing method, the first gas chamber 66 may first be formed through known methods. If desired, the gas chamber 66 may be provided as a single unitary piece, as depicted in FIG. 2. The burst disc 78 and/or the gas-producing material 84 may, for example, be inserted through the assembly aperture 101. The gas-producing material 84 may alternatively be inserted cryogenically, i.e., frozen and compressed into solid form and inserted through a fill opening 88 which may later be sealed with a fill opening seal 89. The initiation assembly 100 may then be inserted into the second gas chamber 68 with the assembly aperture 101 oriented inwardly, and welded in place, for example, through laser welding.

In the alternative to one-piece construction, the gas chamber 66 may be formed as two separate pieces to facilitate the insertion of the burst discs 78, the initiation assembly 100, and the gas-producing material 84. For example, the first end 72 may be separated from the remainder of the gas chamber 66 by a radial seam (not shown), so that the first end 72 and the remainder of the gas chamber 66 form a tube with a circular opening. The burst disc 78, the initiation assembly 100, and/or cryogenic material may easily be inserted into such circular openings and fixed in place. The first end 72 may then be attached, for example, through welding, to the remainder of the gas chamber 66.

Figure 4:
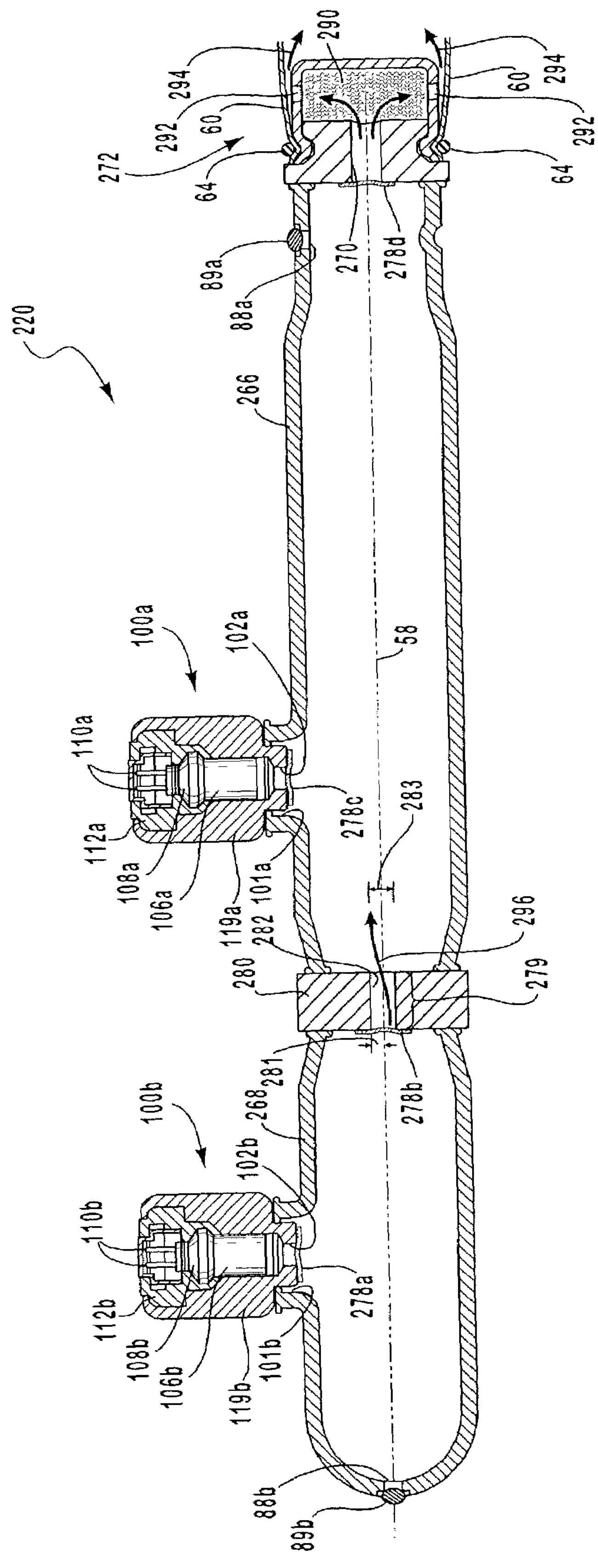
FIG. 4 is a side elevation, cross sectional view of another alternative embodiment of the inflator of the invention.

Many other aspects of the inflator 20 may be varied to suit the geometry of the vehicle 12, the size and shape of the inflatable curtain 10, and the available manufacturing equipment. FIGS. 3 and 4 present alternative dual flow inflators, each of which contains a number of variations from the inflator 20 of FIGS. 1 and 2. These variations may be used in any combination, or in conjunction with other variations that will be recognized by those of skill in the art, to produce a larger number of embodiments of the invention than can be illustrated or specifically described herein.

An alternative inflator 120 according to the invention is shown in FIG. 3. The inflator 120 may have a first gas chamber 166 designed to be installed within an inlet port 60 of an inflatable curtain in much the same manner as the gas chamber 66 of FIG. 2. This first gas chamber 166 also has an initiation assembly 100 for activating the inflator 120. The inflator 120 further includes a second gas chamber 168 attached to the first gas chamber 166 by a flow restrictor 180.

In inflator 120, the first gas chamber 166 is attached to the first inlet port 60 of the curtain (not shown), and sealed to prevent gas escape by a clamp 64. The first chamber contains a gas producing material 84*a*, which may include a gaseous reagent such as a pressurized gas 85*a*, and a liquid reagent 86*a* that could be a liquefied gas 86*a*. These gas-producing materials 84*a* are sealed in first gas chamber 166 by a frangible seal positioned at the first end 172. In FIG. 3 this seal is made up of a burst disc 178*a* held by the pressure of the gas producing materials 84*a* in a sealing manner with an interior cap 174*a*. This burst disc 178*a* may be configured to pass through the opening 176*a* of the interior cap 174*a* in response to a pressure shock or expansion of gas caused by the initiation of the initiation assembly 100. The first gas chamber 166 may also have a burst disc retention member 190 to retain the burst disc 178*a* after activation of the inflator.

The inflator 120 is configured, as inflator 20 of FIG. 1, to produce a first flow of gas 194 which passes out of the first gas chamber 166 through the exit orifice 170 and the exit nozzle 192 into the curtain (not shown) through the inlet port 60.

As briefly noted above, the inflator 120 includes an initiation assembly 100 attached to first gas chamber 166 at an assembly aperture 101. The initiation assembly 100 includes an initiator aperture 102, capped by a burst disc 178*c* through which the heat and other combustion products from the initiation of the initiator 104 pass after ignition of the initiator 104. The initiation assembly 100 further includes a head 106, a body 108, and prongs 110 for connecting the initiator 104 with the electronic system (not shown), including the accelerometer (not shown), of the vehicle. The initiator 104 is retained by an initiator retention member 112 and a housing 119 to keep the initiator in place. The initiator may also have booster material (not shown) contained in a dome (not shown) near the initiator 104 in order to aid in the production of the first flow of gas 194.

As in the inflator 20 of FIGS. 1 and 2, the inflator 120 of FIG. 3 further includes a flow restrictor 180 which joins the first gas chamber 166 with the second gas chamber 168. Here, the flow restrictor 180 may take the form of a restricted flow channel 179. Such a restricted flow channel 179 may be similar to a capillary tube. The restricted flow channel 179 further includes a narrow flow restrictor orifice 182 that limits the rate at which the inflation charge housed in the second gas chamber 168 may escape. The flow channel 179 is defined by a flow restrictor orifice radius 181 and a flow restrictor orifice diameter 183.

The second gas chamber 168 is configured to provide a second flow of gas 196 into the first gas chamber 166, and subsequently into the inflatable curtain (not shown). The second gas chamber 168 is linked to the first gas chamber 166 through the flow restrictor 180. The second gas chamber 168 may also include a fill opening 88*b* and a fill opening seal 89*b* for filling the second gas chamber 168 with a gas producing material 84*b*, which may, as with the inflator 20 of FIGS. 1 and 2, include a gaseous gas producing material 85*b*, and/or a liquid gas producing material 86*b* such as a liquefied gas. In inflator 120, since the first and second gas chambers 166, 168 are separated by the burst disc 178 and its associated structures, including the interior cap 174*b* (which may here be a region of the flow restrictor), the gas chambers 166, 168 may include different gas producing materials 84*a*, 84*b*.

As briefly stated, the flow restrictor 180 may be associated with a burst disc 178*b* and accompanying interior cap 174*b*. The burst disc 178*b* is positioned over opening 176*b* and is held in position against interior cap 174*b* by the pressurized contents of the second gas chamber 168. The second gas chamber may also contain a burst disc retention member that, as described above, contains the retention member after initiation of the inflator to prevent ejection of the disc and any potential accompanying damage caused by the ejected disc.

In inflators 120 of the invention that use a frangible seal over the flow restrictor orifice such as the burst disc 178*b*, the frangible seal may be made to rupture at a specific pressure differential between the first and second gas chambers 166, 168, as discussed earlier. This would open the flow restrictor orifice between the first and second gas chambers, and the gas generant from the second gas chamber would produce a second flow of gas that would add to the first flow of gas created during the initiation of the airbag. This second flow may be used to keep the airbag inflated for an extended period of time, or to reinflate the airbag.

Referring now to FIG. 4, another inflator 220 of the invention is shown. The dual-chambered inflator 220 is configured to include a first gas chamber 266, a second gas chamber 268, and a flow restrictor 280. The first gas chamber 266 includes a first end 272, which has an exit orifice 270 for allowing gases produced in the chambers of the inflator 220 to be transmitted in to an airbag (not shown) via the inlet port 60. In this embodiment of the inflator 220, the exit orifice 270 is capped by a burst disc 278*d*. The first end 272 thus additionally includes a burst disc retention member 290. The first end 272 may additionally comprise an ejection nozzle 292, here having a plurality of nozzles. In this configuration, the plurality of nozzles 292 is shown distributed radially about the first end 272. This first end 272 of the first gas chamber 266 is configured to be attached to a first inlet port 60 of an airbag or inflatable curtain (not shown) by a gas-tight attachment such as clamp 64 to permit effective inflation of an airbag. The first gas chamber 266 may also have a fill opening 88*a* and a fill seal 89*a*.

As with the inflators discussed above, the first gas chamber 266 is configured to retain an inflation charge including a gas generant such as a pressurized gas for generating a first gas flow 294. The attachment of the gas chamber 266 to the first end 272 is a sealed attachment to retain this inflation charge. Similarly, the first gas chamber 266 is also attached in a sealed fashion to a flow restrictor 280 and to an initiation assembly 100*a* that is sealed with a burst disc 278*c*. The flow restrictor 280 connects the first gas chamber 266 with the second gas chamber 268.

The inflator 220 also has a second gas chamber 268, which is attached to the first gas chamber 266 via the flow restrictor 280, which is sealed with a burst disc 278*b*. As with the first gas chamber 266, this second gas chamber 268 may also have a fill opening 88*b* and a fill seal 89*b*. The second gas chamber 268 is similarly configured to retain an inflation charge including a gas generant. The second gas chamber 268 is also sealably attached to an initiation assembly 100*b* that is sealed with a burst disc 278*a*. As previously discussed, additional secondary gas chambers such as 268 may be added either along axis 58 of the inflator 220, or at angles to the axis 58 of the inflator 220 to provide additional flows of gas channeled through the exit orifice 270 for transmission to an inlet port 60 of an airbag.

The flow restrictor 280 linking the first gas chamber 276 with the second gas chamber 278, as with those shown above relating to inflators 20 and 120, may take the form of a restricted flow channel 279. This restricted flow channel 279 may be a capillary tube in communication with a narrow flow restrictor orifice 282. This orifice 282 limits the rate at which the gas produced by the inflation charge housed in the second gas chamber 268 may escape.

The flow channel 279 is defined by a flow restrictor orifice radius 281 and a flow restrictor orifice diameter 283. In this figure, the flow restrictor is shown to further include a burst disc 278*b* placed to block the flow restrictor orifice 282 and segregate the contents of the first and second gas chambers 266, 268. Other frangible seals may be used within the scope of the invention.

In inflator 220, the first and second gas chambers 266 and 268 each include an initiation assembly 100*a*, 100*b*. The initiation assemblies 100*a* and 100*b* are mounted in assembly apertures 101*a*, 101*b*, and include initiator apertures 102*a*, 102*b* that are in communication with the interiors of the first and second gas chambers 266, 268 respectively and capped with burst discs 278*c*, 278*a*, respectively. The initiation assembly 100 may, for example, be laser welded in place to prevent the escape of inflation gases through the assembly aperture 101*a*, 101*b* or ejection of the initiation assembly 100*a*, 100*b* during deployment of the inflator 220.

As above, the initiator assemblies 100*a*, 100*b* include are mounted in assembly apertures 101*a*, 101*b*. The initiator assemblies 100*a*, 100*b* have an initiator aperture 102*a*, 102*b* in communication with the gas chambers 266, 268. The assemblies 100*a*, 100*b* further include an initiator head 106*a*, 106*b*; an initiator body 108*a*, 108*b*; initiator prongs 110*a*, 110*b*; and an initiator retention member 112. When the initiation assemblies are initiated, the burst discs 278*c* and 278*a* are displaced from their original placements, exposing the inflation charges present in the gas chambers 266, 268 to the heat of the initiators.

The initiator assemblies 100*a*, 100*b* may be tuned to be fired independently. Specifically, in some configurations, assembly 100*a* may be fired initially to provide a first gas flow 294. This may be sufficient to initially inflate an airbag such as an inflatable side curtain. In specific configurations, the initiation assembly 100*b* may be fired to provide a second gas flow 296 for maintaining the inflation of or reinflating the airbag. This may be useful in situations including, but not limited to, rollover accidents, in which it may be desirable to maintain the inflation of the airbag for a longer period of time than normally desired. Similarly, this may be useful to allow the reinflation of an airbag.

In such applications, it is desirable to have two separate chambers separated by a frangible seal and activated independently by controllable initiators. This allows an electronic control unit associated with the airbags to be configured to vary the deployment of the airbag in a number of ways by controlling whether one or both initiator assemblies 100*a*, 100*b* are used, and whether a single or multiple flows of gas are produced by the inflator. This affects the function and use of the airbag attached to the inflator 220.

As with the above-mentioned inflators 20, 120, the first and second gas chambers 266, 268 may be filled with a variety of gas-producing materials 84, including gaseous 85 and liquid 86 gas-producing materials. In FIG. 4, however, the inflation charges have been omitted for clarity. Where, as in FIG. 4, the gas chambers 266, 268 are held separate by the flow restrictor 280 and burst disc 278*b*, the gas-producing materials used in the first gas chamber 266 and the second gas chamber 268 may be independently selected.

In summary, the inflators of the invention may be configured to provide a first flow of gas and a second flow of gas. The first flow of gas is generated from a gas generant supply placed within the first gas chamber. The first flow of gas is initiated either directly by an initiator assembly placed within the first gas chamber or indirectly by an initiator assembly placed within the second gas chamber. The initiation of the device ruptures the frangible seal of the first gas chamber and heats the gas generant of the first gas chamber, thus causing gas formation and gas flow from the first gas chamber. This first flow of gas is then preferably channeled into an attached airbag such as an inflatable curtain.

According to the invention, the inflators provided may be configured to provide a second flow of gas after the first flow of gas has been initiated. This flow may be initiated passively or actively. In passive configurations, such as when the flow restrictor is an open orifice, when the first flow of gas has begun to exit the inflator through the exit orifice, the second flow of gas may begin. This similarly occurs when the flow restrictor, though sufficiently narrowed to meter the flow of gas, has no complete blockage.

Such a passive initiation may also occur when the flow restrictor is closed, and when the initiator of the first gas chamber has fired and the first gas chamber has begun to empty, producing a pressure differential between the chambers sufficient to open the flow restrictor. This may be achieved when the second gas chamber includes a pressure sensitive frangible seal such as a burst disc configured to rupture at a specific pressure gradient. In such an inflator, the gas generants housed in the first and second gas chambers would be pressurized. Upon partial emptying of the first gas chamber after initiation of the first gas flow, the pressure gradient between the high pressure of the second gas chamber and the decreasing pressure of the first gas chamber would be sufficient to rupture the seal and initiate the second gas flow.

Alternatively, and in a preferred embodiment of the invention, an initiator placed in each gas chamber may be used to independently initiate the first and second flows of gas. In such an inflator, a frangible seal may be associated with the second gas chamber to prevent early escape of the gas generants stored within the second gas chamber. In these inflators, the initiators may be optionally connected to a controller, which may control the initiation of the first gas chamber separately from the initiation of the second gas chamber. Such inflators may thus be enabled to function in a manner adjustable to the individual circumstances of a given collision.

"Smart" inflators such as these may be tuned to fire only the first initiator and cause only the first flow of gas in minor collisions. Additionally, such inflators could be tuned to detect severe collisions and fire each initiator at adjustable intervals to assure extended inflation of the inflatable curtain or airbag connected to the inflator. Such function would be especially useful in rollover collisions, which could be detected by the controller module and responded to by firing both initiators in sequence so as to provide an extended flow of inflation gas and thus an airbag that is supportive over an extended period of time relative to conventional airbags. Finally, the controller could be configured to completely reinflate the airbag using the inflation charge of the second gas chamber in response to a second collision occurring shortly after the triggering collision or other suitable event.

The dual stage inflators of the present invention thus provide a significant advancement in airbag design. Through the elimination of redundant initiators in many cases, the addition of the second gas chamber, the use of the flow restrictor, and the refinement of exit orifice designs, airbag systems may be produced and installed with less time and expense. Furthermore, the use of axial flow exit orifices and second gas chambers with flow restrictors enables a single inflator to rapidly and uniformly provide inflation gas for an airbag possibly comprising multiple protection zones, and then to maintain an inflation pressure sufficient to protect a vehicle occupant over a period of time. This inflation pressure may be maintained using methods such as providing a second stream of inflation gas to the airbag. The methods could include providing a first inflation flow of gas to the airbag that is cooler than the ambient air, and that then expands as it warms.

As explained above, such airbag inflators yielding extended gas flow are especially important in rollover collisions in which lateral protection is needed for periods of time that exceed those protection periods required or even desired in ordinary airbag applications. Such extended time periods may range from five seconds to eight seconds to even twenty seconds. The provision of an airbag inflator that makes such extended inflation possible is an improvement in the art.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A dual stage inflator for a vehicular airbag system, the inflator comprising:

a first gas chamber having an exit orifice, the exit orifice having an open configuration and a closed configuration;

a second gas chamber;

a flow restrictor positioned between the first gas chamber and the second gas chamber;

an initiator to selectively initiate a flow of gas through the exit orifice, wherein the flow of gas comprises a first flow of gas from the first gas chamber and a second flow of gas from the second gas chamber, wherein the second flow of gas flows through the first gas chamber, and wherein the first flow of gas is sufficient to fully inflate an airbag and the second flow maintains the airbag in an inflated state; and a burst disc retention member positioned within the inflator such that the flow of gas passes through the burst disc retention member prior to entering the airbag, wherein the burst disc retention member is located along the longitudinal axis of the inflator and is positioned between a burst disc that seals the first chamber and an ejection nozzle through which the flow of gas enters the airbag.

2. The dual stage inflator of claim 1, wherein the initiator coupled to the first gas chamber.

3. The dual stage inflator of claim 1, wherein the initiator is coupled to the second gas chamber.

4. The dual stage inflator of claim 1, wherein the initiator is coupled to the first gas chamber and another initiator is coupled to the second gas chamber.

5. The dual stage inflator of claim 1, wherein the flow restrictor comprises a restricted flow channel.

6. The dual stage inflator of claim 1, wherein the flow restrictor comprises a frangible seal.

7. The dual stage inflator of claim 6, wherein the flow restrictor comprises a burst disc.

8. The dual stage inflator of claim 1, wherein the dual stage inflator further comprises a gas generant for generating the flow of gas.

9. The dual stage inflator of claim 8, wherein the gas generant comprises a mixture of gases.

10. The dual stage inflator of claim 9, wherein the gases are selected from the group consisting of helium, argon, $N_2O$, and $CO_2$.

11. The dual stage inflator of claim 9, wherein the mixture of gases comprises liquefied gases.

12. The dual stage inflator of claim 11, wherein the mixture comprises liquefied $N_2O$ and $CO_2$.

13. The dual stage inflator of claim 8, wherein the gas generant comprises a liquefied gas.

14. The dual stage inflator of claim 13, wherein the gas generant further comprises a solid.

15. The dual stage inflator of claim 8, wherein the gas generant comprises a combination of a gas and a liquefied gas.

16. The dual stage inflator of claim 8, wherein the gas generant comprises a solid.

17. The dual stage inflator of claim 16, wherein the gas generant further comprises a gas.

18. The dual stage inflator of claim 1, wherein the exit orifice is configured to regulate the flow rate of the flow of gas.

19. A dual stage inflator for a vehicular airbag system, the inflator comprising:

a first gas chamber having an exit orifice, the exit orifice having an open configuration and a closed configuration;

a second gas chamber;

a flow restrictor comprising a restricted flow channel sized to limit a flow rate of a flow of gas from the second gas chamber into the first gas chamber, said flow restrictor being positioned between the first gas chamber and the second gas chamber;

an initiator to selectively initiate a flow of gas through the exit orifice, wherein the flow of gas comprises a first flow of gas from the first gas chamber and a second flow of gas from the second gas chamber, wherein the first flow of gas is sufficient to fully inflate an airbag and the second flow maintains the airbag in an inflated state; and a burst disc retention member positioned within the inflator such that the flow of gas passes through the burst disc retention member prior to entering the airbag, wherein the burst disc retention member is located along the longitudinal axis of the inflator and is positioned between a burst disc that seals the first chamber and an ejection nozzle through which the flow of gas enters the airbag.

20. The dual stage inflator of claim 19, wherein the inflator further comprises a gas generant for providing the flow of gas out of the exit orifice.

21. The dual stage inflator of claim 20, wherein the gas generant is a mixture of gases.

22. A dual stage inflator for a vehicular airbag system, the inflator comprising:

a first gas chamber having an exit orifice, the exit orifice having an open configuration and a closed configuration;

a second gas chamber;

an initiator to selectively initiate a flow of gas through the exit orifice;

a flow restrictor comprising a physical barrier configured to seal the flow restrictor until the flow of gas is initiated, said flow restrictor being positioned between the first gas chamber and the second gas chamber, wherein the flow of gas comprises a first flow of gas from the first gas chamber and a second flow of gas from the second gas chamber into the first gas chamber, wherein the first flow of gas is sufficient to fully inflate an airbag and the second flow maintains the airbag in an inflated state; and a burst disc retention member positioned within the inflator such that the flow of gas passes through the burst disc retention member prior to entering the airbag, wherein the burst disc retention member is located along the longitudinal axis of the inflator and is positioned between a burst disc that seals the first chamber and an ejection nozzle through which the flow of gas enters the airbag.

23. The dual stage inflator of claim 22, wherein the physical barrier comprises a frangible seal.

24. The dual stage inflator of claim 23, wherein the frangible seal is a burst disc.

25. The dual stage inflator of claim 22, wherein the inflator further comprises a gas generant for providing the flow of gas.

26. The dual stage inflator of claim 25, wherein the gas generant comprises a mixture of gases.

27. The dual stage inflator of claim 26, wherein the gases are selected from the group consisting of helium, argon, $N_2O$, and $CO_2$.

28. The dual stage inflator of claim 26, wherein the mixture of gases comprises liquefied gases.

29. The dual stage inflator of claim 28, wherein the mixture comprises liquefied $N_2O$ and $CO_2$.

30. The dual stage inflator of claim 25, wherein the gas generant comprises a liquefied gas.

31. The dual stage inflator of claim 25, wherein the gas generant comprises a solid.

32. The dual stage inflator of claim 25, wherein the gas generant is a combination of a gas and a liquefied gas.

33. The dual stage inflator of claim 31, wherein the gas generant comprises a cryogenically formed solid.

34. The dual stage inflator of claim 33, wherein the gas generant further comprises a gas.

35. A dual stage inflator for a vehicular airbag system, the inflator comprising:

a first gas chamber having an exit orifice, the exit orifice having an open configuration and a closed configuration, the first gas chamber further including a first initiator attached to the first gas chamber, the first initiator being configured to initiate a first flow of gas from the first gas chamber;

a second gas chamber, the second gas chamber including a second initiator attached to the second gas chamber, the second initiator being configured to initiate a second flow of gas from the second gas chamber;

a flow restrictor positioned between the first gas chamber and the second gas chamber, wherein the flow restrictor has a closed configuration in which the first and second gas chambers are separated, and an open configuration in which the first and second gas chambers are placed in fluid communication, wherein the first flow of gas is sufficient to fully inflate an airbag, wherein the second flow of gas flows from the second gas chamber into the first gas chamber through the flow restrictor; and a burst disc retention member positioned within the inflator such that the flow of gas passes through the burst disc retention member prior to entering the airbag, wherein the burst disc retention member is located along the longitudinal axis of the inflator and is positioned between a burst disc that seals the first chamber and an ejection nozzle through which the flow of gas enters the airbag.

36. The dual stage inflator of claim 35, wherein the exit orifice of the first gas chamber is placed in the closed configuration with a frangible seal.

37. The dual stage inflator of claim 35, wherein the flow restrictor is placed in its closed configuration with a frangible seal.

38. The dual stage inflator of claim 35, wherein the inflator provides only a first flow of gas by actuating the first initiator.

39. The dual stage inflator of claim 35, wherein the inflator provides a first flow of gas by actuating the first initiator and a second flow of gas by actuating the second initiator.

40. The dual stage inflator of claim 39, wherein the inflator provides the second flow of gas to maintain the inflation of an airbag.

41. The dual stage inflator of claim 39, wherein the inflator provides the second flow of gas to reinflate an airbag.

42. A dual stage inflator for a vehicular airbag system comprising a first gas chamber with an exit orifice with open and closed configurations; a second gas chamber, the second gas chamber including at least one flow restrictor, the flow restrictor positioned between the first gas chamber and the second gas chamber; an initiator positioned in the first gas chamber, wherein the initiator is configured to selectively initiate a flow of gas through the exit orifice, wherein the flow of gas comprises a first flow of gas from the first gas chamber and a second flow of gas from the second gas chamber into the first gas chamber, wherein the first flow of gas is sufficient to fully inflate an airbag and the second flow maintains the airbag in an inflated state; and a burst disc retention member positioned within the inflator such that the flow of gas passes through the burst disc retention member prior to entering the airbag, wherein the burst disc retention member is located along the longitudinal axis of the inflator and is positioned between a burst disc that seals the first chamber and an ejection nozzle through which the flow of gas enters the airbag.

* * * * *